Aug. 18, 1964  K. D. FAAS  3,144,737

ALUMINUM FOIL LENS GRINDING PAD

Filed Sept. 27, 1962

INVENTOR.
KENNETH D. FAAS
BY
Frank C. Parker
ATTORNEY

United States Patent Office 3,144,737
Patented Aug. 18, 1964

3,144,737
ALUMINUM FOIL LENS GRINDING PAD
Kenneth D. Faas, Henrietta, N.Y., assignor to Bausch & Lomb Incorporated, Rochester, N.Y., a corporation of New York
Filed Sept. 27, 1962, Ser. No. 226,641
1 Claim. (Cl. 51—185)

The present invention relates to the grinding of glass or plastic lens blanks and more particularly to an improved overlay for a glass lens grinding tool.

The principal object of the present invention is to provide an improved metallic foil overlay for a lens grinding or polishing tool which may be adhered to the tool substantially without deforming the shape thereof and which provides the proper surface for conveying a slurry of grinding media over the surface of the tool.

A further object of the present invention is to provide a metallic foil overlay for a lens grinding or polishing tool which is partially cut away throughout the area thereof to form a slot-like configuration for facilitating a smooth fit of the foil over the surface of the tool.

A particular advantage of the present invention is that it provides a replaceable overlay device which may be cemented onto the curved surface of a glass or plastic lens grinding tool and which will conform smoothly to the surface of the foil without wrinkling or otherwise deforming the active surface of the tool with the overlay in place.

The foregoing and other objects and advantages of the present invention will be more apparent from the following detailed description when read in conjunction with the accompanying drawing wherein.

Figure 1:
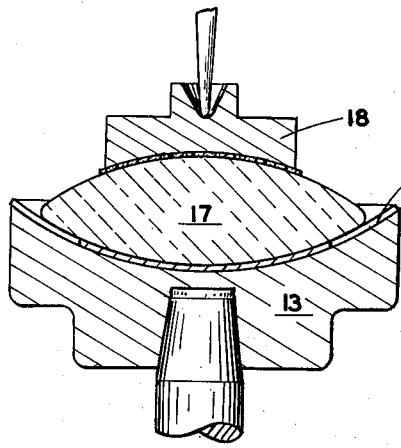
FIG. 1 is a vertical section through a concave lens grinding tool with the overlay of the present invention in place on the concave surface of the tool.
Figure 2:
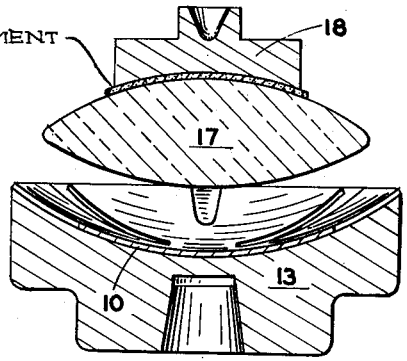
FIG. 2 is a vertical section through a concave lens grinding tool but with the tool and lens shown separated from each other.
Figure 3:
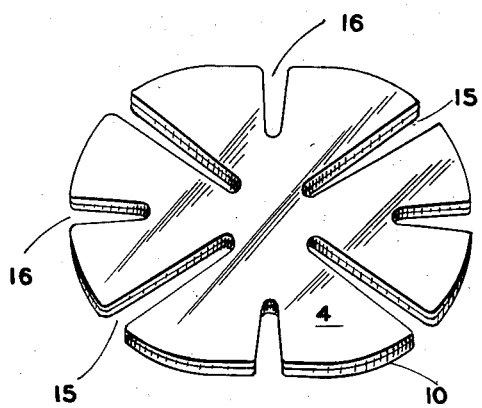
FIG. 3 is a perspective view of the foil overlay with a protective coating adhered to one surface thereof.
Figure 4:
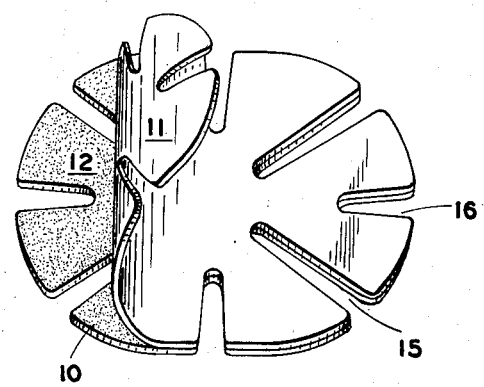
FIG. 4 is a perspective view of the foil overlay similar to FIG. 3 but with the protective coating shown partly removed from the surface of the foil.
Figure 5:
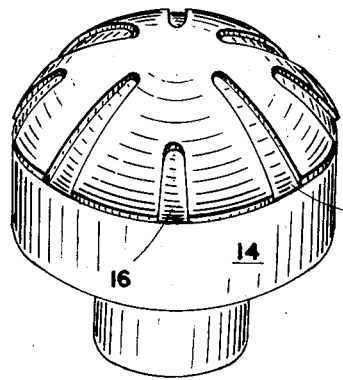
FIG. 5 is a perspective view of a convex lens grinding tool with the metallic foil overlay in place thereon.

With reference now to the drawings, wherein like reference numerals have been used in the different views to identify identical parts, the metallic foil overlay of the present invention comprises a sheet of soft aluminum foil 10 and a protective coating 11 which may preferably be a sheet of paper impregnated with wax or some other suitable material which is no more than only slightly adhesive. The foil is coated on one side with a pressure sensitive adhesive 12 of any desired variety, it having been found that latex base pressure sensitive adhesives are particularly suitable. The pressure sensitive adhesive 12 serves the purpose of retaining the foil 10 and the protective coating 11 together but is not so adherent to the protective coating but that the latter can be readily peeled from the adhesive 12, thereby leaving the adhesive 12 in place on the surface of the foil.

It is contemplated that the foil overlay comprising the foil 10 and protective sheet 11 will be partially cut away throughout the area thereof to form a slot-like configuration which facilitates fitting the foil 10 on either the surface of a concave lens grinding tool 13 or a convex lens grinding tool 14. It has been found that the generally radially extending slots 15 and 16 which extend to the periphery of the foil overlay are particularly suitable for facilitating smoothly fitting the foil overlay 10 on the active surface of the lens grinding tool 13 or 14. It is contemplated that the slots could have other configurations than as shown.

The foil overlays 10 with the protective sheets 11 in place thereon are handled as such until they are to be used. The protective coating 11 is then peeled off and the pressure sensitive adhesive 12 functions to hold the foil 10 is place on the surface of the lens grinding tool. It is contemplated that the lens blanks to be ground, indicated by reference numeral 17 will be blocked by pitch or some other media onto a lens block 18. The lens is then moved against the tool 13 or 14 with the foil in place thereon. An abrasive slurry is flowed over the foil and upon rotation of the tool and foil with a general back and forth motion of the lens 17 the surface of the lens will be very quickly ground smooth as desired.

It has been found that the very shallow spaces on the tool provided by the slots 15 and 16 facilitate conveyance of the abrasive slurry over the surface of the tool. It normally requires only a matter of a few minutes to grind a lens by the use of the herein described foil overlays and each may be used for several lenses. In fact, a polishing pad may be placed on the tool without removing the foil overlay in order to enable final polishing of the lens. Thereafter the polishing pad may be removed and the foil overlay reused for grinding another lens.

It is contemplated that changes and modifications may be made in the present invention without departing from the spirit or scope thereof.

What is claimed is:

An overlay for a curved tool for grinding lens blanks, comprising a sheet of soft aluminum foil having a peripheral configuration approximating that of the tool, a coating of adhesive on one side of the foil for adhering the foil to the tool, and said foil being partially cut away throughout the area thereof to form a slot-like configuration for facilitating a smooth fit of the foil on the curved surface of the tool and for conveying a slurry of grinding media over the surface of the tool.

References Cited in the file of this patent
UNITED STATES PATENTS

| | | |
|---|---|---|
| 2,282,650 | Fenton | May 12, 1942 |
| 2,752,738 | Seifert | July 3, 1956 |